United States Patent [19]

Woolley

[11] 4,061,936
[45] Dec. 6, 1977

[54] SYNCHRONOUS MOTOR

[75] Inventor: Lee A. Woolley, Kokomo, Ind.

[73] Assignee: The Scott & Fetzer Co., Kokomo, Ind.

[21] Appl. No.: 680,532

[22] Filed: Apr. 26, 1976

[51] Int. Cl.² .......................................... H02K 7/118
[52] U.S. Cl. ................................... 310/41; 310/162; 310/164
[58] Field of Search ................. 310/41, 156, 162–165, 310/756

[56] References Cited

U.S. PATENT DOCUMENTS

| | | | |
|---|---|---|---|
| 3,119,941 | 1/1964 | Guiot | 310/156 X |
| 3,307,056 | 2/1967 | Woolley | 310/41 |
| 3,348,083 | 10/1967 | Ihariba | 310/164 |
| 3,857,053 | 12/1974 | Yatsushiro et al. | 310/41 X |

Primary Examiner—Donovan F. Duggan
Attorney, Agent, or Firm—McNenny, Pearne, Gordon, Gail, Dickinson & Schiller

[57] ABSTRACT

A self-starting, high running torque, synchronous motor is disclosed. The motor has an annular stator and a cylindrical rotor mounted within and spaced from the inner cylindrical periphery of the stator. The rotor is provided with a plurality of evenly spaced rotor poles about its cylindrical periphery. Spaced, axially tapered poles are provided about the inner periphery of the stator. One stator pole is angularly and circumferentially offset to serve as a starting pole, while the remaining stator poles are evenly spaced about an arc which does not include the offset pole.

5 Claims, 5 Drawing Figures

U.S. Patent     Dec. 6, 1977     4,061,936
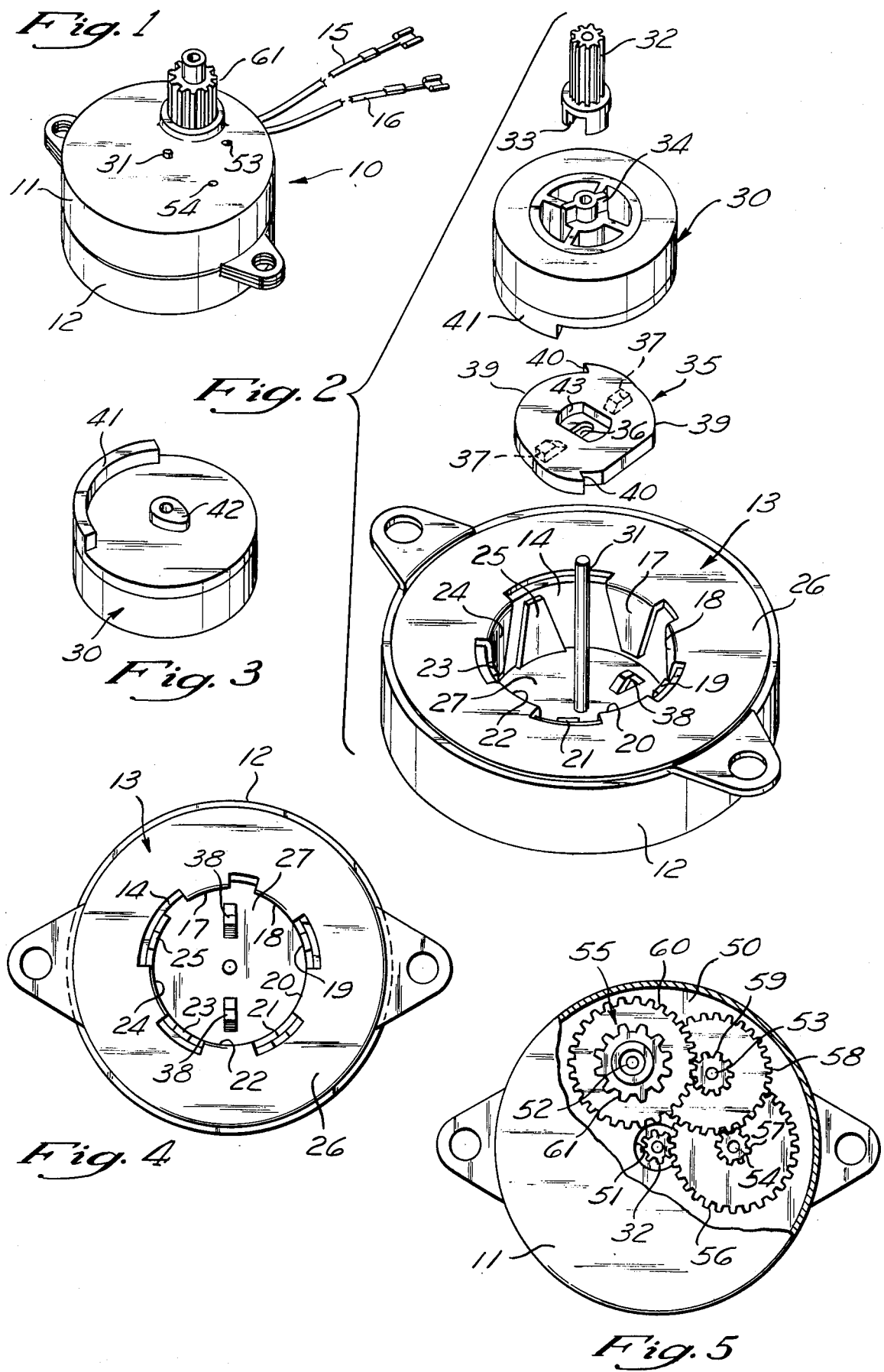

SYNCHRONOUS MOTOR

BACKGROUND OF THE INVENTION

This invention relates to synchronous motors and, more particularly, to a self-starting, high running torque, synchronous motor. Small synchronous motors are widely used in timing devices such as clocks and appliance timers. Those motors have a rotor which is provided with a number of permanently magnetic poles about its periphery. The rotor is mounted within a stator which includes a number of windings in the form of an annulus. Poles are provided on the stator which change polarity as a function of the frequency. As is known, synchronous motors may turn in either direction, depending on the relative at-rest position of the rotor and stator. Therefore, various devices have been proposed to ensure rotation of the rotor in a predetermined direction, and one such device is disclosed in U.S. Pat. No. 3,307,086.

However, upon starting, the rotor may be in a balanced condition where the forces tending to move the rotor in both directions are balanced. Therefore, prior art synchronous motors have been provided with asymmetrical rotor or stator conditions so that the rotor will be urged to turn. Prior art synchronous motors have been provided with a relatively large number of rotor and stator poles, and it is customary to misalign a number of stator poles to produce an asymmetrical condition for starting. It was believed that for starting purposes a relatively large number of poles should be misaligned or offset from the remaining evenly spaced poles to increase the chances of the rotor poles to be in a starting condition without unnecessary hunting by the rotor. For example, one such prior art motor had a 22-pole rotor, with those poles being equally spaced, and a stator having a total of 20 poles, with 10 evenly spaced and 10 offset. The evenly spaced poles in such a motor are considered to be the running poles, since they provide an ideal field condition for running torque. The offset poles are called "starting poles" since they provide the asymmetric field conditions for starting purposes, but there exists a torque loss under running conditions. Prior art synchronous motors, therefore, were a compromise between optimum running conditions and optimum starting conditions.

SUMMARY OF THE INVENTION

This invention provides a high-torque, self-starting synchronous motor, in which a single starting pole is employed and in which tapered poles are employed for added torque. According to a specific embodiment of the invention, the offset pole is provided on the stator and the stator includes eight evenly spaced poles and one misaligned pole. A 10-pole rotor is provided, and the rotor is provided with a one-way motion-compelling device so that the motor will only run in a predetermined direction. It is believed that the tapered poles provide a gradual attraction of the straight rotor poles, and a proportionate gradual repulsion of an adjacent straight pole should provide added running torque. The motor according to this invention provides 500 in./ozs. of torque at 1 r.p.m., as compared to 150 in./ozs. of torque at 1 r.p.m., which is the output of the previously described motor having a 22-pole rotor and 20 stator poles.

BRIEF DESCRIPTION OF THE DRAWING

FIG. 1 is a perspective view of a synchronous motor in accordance with this invention;

FIG. 2 is an exploded view of the motor, with the gear casing and the gear train not illustrated for purposes of clarity;

FIG. 3 is a perspective view of a one-way motion compelling device;

FIG. 4 is a plan view of the stator poles; and

FIG. 5 is a plan view of the motor, with a portion of the gear casing removed to show the gear train.

DETAILED DESCRIPTION OF THE INVENTION

Referring now to the drawing, there is illustrated a synchronous motor 10 having a pair of cup-shaped casing members 11 and 12. The casing member 12 houses a stator 13 which includes a plastic bobbin 14 in the form of a spool. A large number of windings (not shown) are provided on the spool. Reference may be had to U.S. Pat. No. 3,307,086 for a similar spool arrangement. The subject matter of that patent is incorporated herein by reference. The coil terminates with leads 15 and 16, which are connected to a source of alternating current. The stator also includes stator poles 17, 18, 19, 20, 21, 22, 23, 24, and 25. The poles 17, 18, 20, 22, and 24 are struck out of a stator plate member 26, and are bent to embrace the inner cylindrical periphery of the bobbin 14. The poles 19, 21, 23, and 25 are struck out of the bottom floor 27 of the casing 12 and bent to embrace the inner cylindrical periphery of the bobbin 14. The poles associated with the stator plate 26 are of opposite polarity with respect to the poles associated with the floor 27. All of the poles 17–25 are tapered, and in the embodiment shown define an included angle of 36 degrees between their tapered sides. The poles 18–25 are evenly spaced apart with a pole-to-pole spacing of 36 degrees, while the pole 17 is offset from the pole 18 and from the even pole-to-pole spacing of 36° by 18° to create an asymmetric field and to serve as a starting pole. Therefore, the total spacing of the pole 18 from the pole 17 is 54°.

A permanent magnet rotor 30 is rotatably mounted on the pin 31, which is staked into the floor 27. The rotor 30 is provided with 10 evenly spaced poles about the cylindrical periphery of the rotor 30. The rotor 30 is comprised of a ferrite ring and a thermoplastic hub, the ferrite ring having alternate magnetic poles on its periphery. Such rotors are well known in the art. The rotor 30 drives a pinion gear 32, which is also rotatably mounted on the pin 31 and which has a slot 33 in driven engagement with a tongue 34 on the rotor 30.

In order to ensure that the rotor 30 will run only in a predetermined direction, means are provided for mechanically reversing direction of rotor rotation only in the event that the motor should begin to rotate in the wrong direction. There is therefore provided a disc 35 which is placed between the rotor 30 and the floor 27, with the pin 31 projecting through an elongated aperture 36 in the disc. The elongated aperture 36 permits the disc to slide in a plane transverse to the axis of rotation of the rotor. The disc 35 is constrained against rotation by recesses 37 which are engaged by projections 38 in the floor 27. The resesses 37 are radially larger than the projections 38 to permit lateral movement of the disc 35. The disc 35 has a peripheral cam track 39 and at least one transverse or substantially radial stop face 40. The rotor 30 is provided with an arcuate flange 41, which is engageable with the cam track 39 on the disc 35 and with the stop face 40.

When the motor starts in the correct direction, which in the illustrated embodiment is counterclockwise, and during normal running thereof, the flange 41 is kept clear of the cam track by a rotor cam 42, which gradually slides the disc away from the flange 41 by acting within an elongated recess 43 in the disc. There is sufficient clearance for the flange 41 to pass a stop member 40. Once the flange passes a stop member, the rotor cam shifts the disc to a position where that stop face is displaced in what would be the path of the flange 41 if the flange 41 were thereafter rotated in the opposite or clockwise direction. Thus, if the rotor tends to move in the wrong direction, such direction can continue only until movement of the flange 41 is blocked by engagement with the stop face 40 disposed in its path. When such engagement occurs, the rotor will tend to rebound and start in the proper direction.

The rotor 30 and the poles 17-25 are covered by a plate 50, which has an aperture 51 so that the gear 32 extends through the plate. Mounted on the plate by pins 52, 53, and 54 is a gear train 55. The gear train 55 includes integrally connected gears 56 and 57, integrally connected gears 58 and 59, and integrally connected gears 60 and 61. The gear train 55 is covered by the cup 11, with the gear 61 projecting therethrough.

The invention is not restricted to the slavish limitation of each and every detail set forth above. Obviously, devices may be provided with change, eliminate, or add certain specific details without departing from the scope of the invention.

What is claimed is:

1. A synchronous motor comprising an annular stator having a cylindrical inner periphery, a cylindrical rotor mounted within and spaced from an inner cylindrical periphery of the stator, said rotor having a plurality of rotor poles spaced about its cylindrical periphery, said stator having a plurality of stator poles spaced about its inner periphery, one of said pluralities having axially tapered poles with one of said tapered poles being angularly and circumferentially offset from the remaining poles of said one of said pluralities, said remaining poles being equally spaced from each other about an arc which does not include the offset pole.

2. A synchronous motor according to claim 1, wherein said one of said pluralities is the plurality of stator poles.

3. A synchronous motor according to claim 2, wherein there are provided nine stator poles and 10 rotor poles.

4. A synchronous motor according to claim 3, wherein the tapered poles have an included angle of 36°.

5. A synchronous motor according to claim 4, wherein the center-to-center spacing of each equally spaced pole is 36°.